Figure 1:
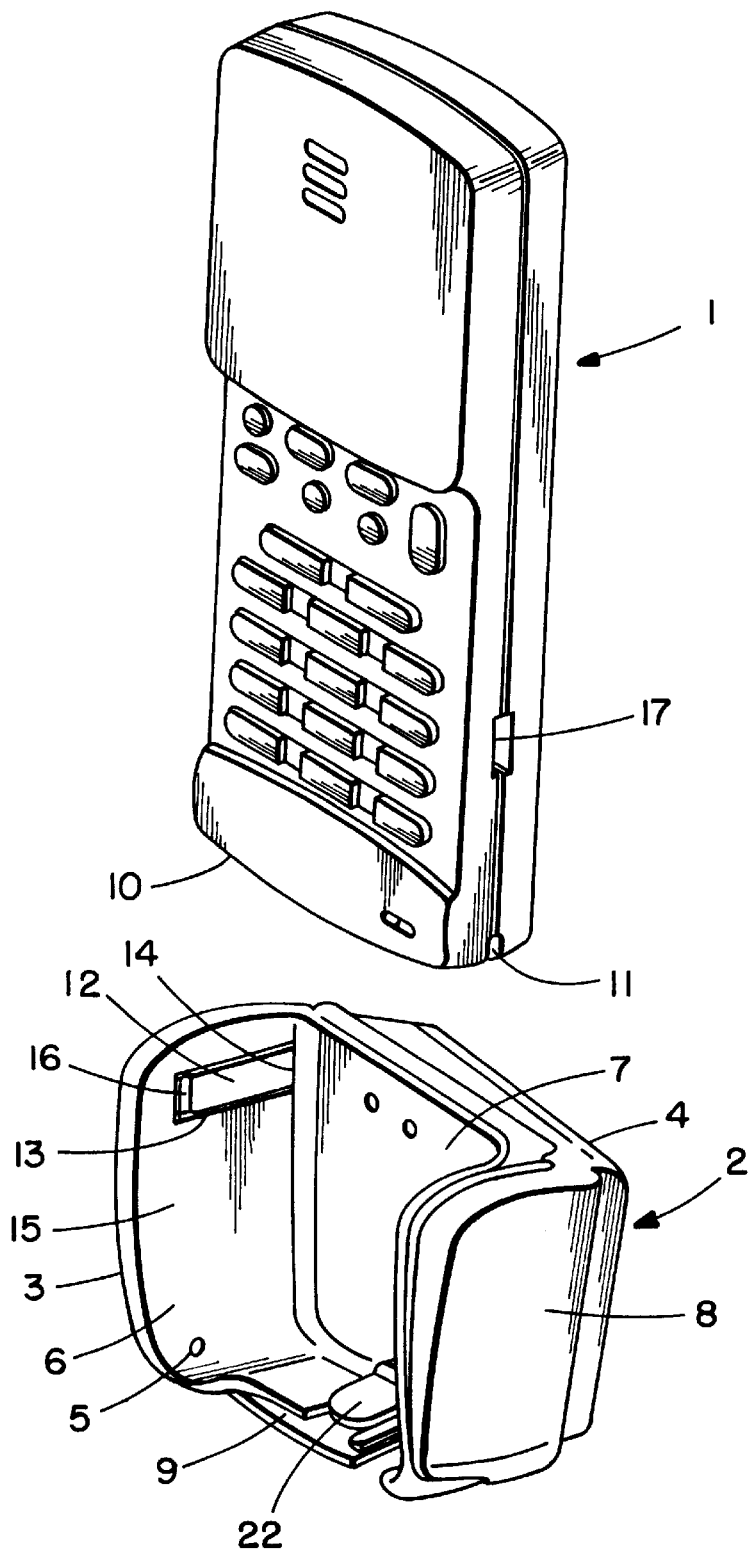

United States Patent [19]
Niemo et al.

[11] Patent Number: 5,898,775
[45] Date of Patent: Apr. 27, 1999

[54] TELEPHONE HOLDER WITH AUTOMATICALLY MOVED RETAINING MEMBERS

[75] Inventors: Mika Niemo; Jari Olkkola, both of Salo; Ari Leman, Pertteli, all of Finland

[73] Assignee: Nokia Mobile Phones Limited, Espoo, Finland

[21] Appl. No.: 08/227,093

[22] Filed: Apr. 13, 1994

Related U.S. Application Data

[63] Continuation of application No. 07/985,185, Dec. 2, 1992, abandoned.

[30] Foreign Application Priority Data

Dec. 5, 1991 [FI] Finland ..................................... 915765

[51] Int. Cl.⁶ .................................................. H04M 1/00
[52] U.S. Cl. ........................................... 379/446; 379/455
[58] Field of Search ..................................... 379/455, 449, 379/446, 454, 426, 433, 437; 248/221.3, 221.4, 309.1; D14/138

[56] References Cited

U.S. PATENT DOCUMENTS

| | | |
|---|---|---|
| D. 327,070 | 6/1992 | Watanabe ................................ D14/138 |
| 4,406,928 | 9/1983 | MacKenzie . |
| 4,640,542 | 2/1987 | Watjer et al. ............................ 296/312 |
| 4,957,264 | 9/1990 | Hakanen .................................. 248/510 |
| 5,121,863 | 6/1992 | Kotitalo et al. .......................... 379/446 |
| 5,142,573 | 8/1992 | Umezawa .................................. 455/90 |

FOREIGN PATENT DOCUMENTS

| | | |
|---|---|---|
| A-0 280 061 | 8/1988 | Germany . |
| 40 15 091 A1 | 1/1991 | Germany . |
| 85949 | 4/1991 | Japan ..................................... 379/433 |

OTHER PUBLICATIONS

Patent Abstracts of Japan, vol. 13, No. 280 (E–7790 27 Jun. 1989 and JP–A–10 67 054 (Aisin Seiki Co. Ltd.) 13 Mar. 1989, Umebayashi Kazuyuki.

*Primary Examiner*—Jack Chiang
*Attorney, Agent, or Firm*—Perman & Green, LLP

[57] ABSTRACT

A holder for a telephone, the holder being a cradle portion which is movable between a first and a second position with respect to a mounting portion. The holder comprising retaining members which are urged into and out of contact with a telephone in the cradle portion when the cradle portion is moved between said first and said second position. The retaining members lock the telephone in position with respect to the cradle portion of the holder, when the cradle portion is in the first position.

14 Claims, 3 Drawing Sheets

FIG. I.

TELEPHONE HOLDER WITH AUTOMATICALLY MOVED RETAINING MEMBERS

This is a continuation of application Ser. No. 07/985,185 filed on Dec. 2, 1992, now abandoned.

The present invention relates to a telephone holder and in particular to a telephone holder for use with a radio phone.

In accordance with the present invention, references to a telephone refer particularly to a telephone handset such as the handset of a radio phone. Telephone holders have to date been complicated in design and composed of a great number of parts. Therefore assembling said parts has been difficult and time consuming. The holders have also been difficult to use and have caused scratching of the telephone handset.

An advantage of the invention is to produce a less complicated telephone holder in which the drawbacks of prior art holders have been avoided.

According to the present invention there is provided a holder for a telephone comprising a cradle portion formed to receive a telephone, a mounting portion, the cradle portion being movably mounted on the mounting portion, and retaining means movable from a non-retaining position, wherein the retaining means do not exert a retaining force on a telephone placed in the cradle portion, to a retaining position, wherein the retaining means exerts a retaining force on a telephone placed in the cradle portion, wherein movement of the cradle portion between a first position and a second position urges the retaining means between said non-retaining position and said retaining position.

In a holder in accordance with the invention a telephone is positioned in placed within the cradle portion of the holder, whereafter locking of the telephone in position is enabled by rotating the cradle portion and mounting portion of the holder relative to each other. The telephone will not therefore move relative to the cradle portion during the locking operation and no abrasion or scratching of the telephone occurs. The use of the holder is simple because fixing the telephone to the holder and releasing it therefrom are carried out with a single movement.

The holder is preferably composed of two substantially nested portions, of which the cradle portion, located more inside, serves as a base for the telephone. The portions of a holder of this type can be articulated, and a linking pin located between the lower parts may in addition be arranged to serve as a retainer for the lower part of the telephone inserted in the holder.

The holder may preferably be formed into a cup comprising a bottom and three side walls, on the fourth side of which, i.e. the open side, a telephone may easily be inserted in place into the holder and pushed, together with the base, into a position in which the telephone is locked within the holder.

The retaining members or locking members grasping the telephone set are preferably projections on the inner surface of the front part of the holder which can be urged into recesses provided for that purpose on the sides of the telephone. The design may be implemented e.g. by arranging resilient, strip-like tongues on the sides of the cradle portion of the holder the tongues being at one end thereof fastened to the holder. The tips of the tongues are shaped into projections insertable into a recesses in the telephone. The tongues are located adjacent to the clamping surfaces in the mounting portion of the holder so that the tongues, in the course of a mutual movement of the cradle and mounting portions of the holder, are urged towards the telephone handset in the holder. Thus the tips formed into projections lock the telephone into the holder.

The holder may comprise a detent provided with springs, arranged to lock the parts of the holder with each other after they have been rotated into a mutual locking position, in which also the telephone has, owing to the rotary movement, become locked in position. The mutual movement between the portion of the holder may in such instance be regulated by arranging the telephone positioned in the holder to depress the detent so that the detent first releases the holder parts to rotate relative to one another, and then locks the parts in place after they have reached their mutual locking position. The detent member may be composed e.g. of a rod-like slide placed on the cradle portion of the holder serving as the base for the telephone and the tip thereof being arranged to be locked in a recess arranged for said purpose in an mounting portion of the holder.

Figure 2:
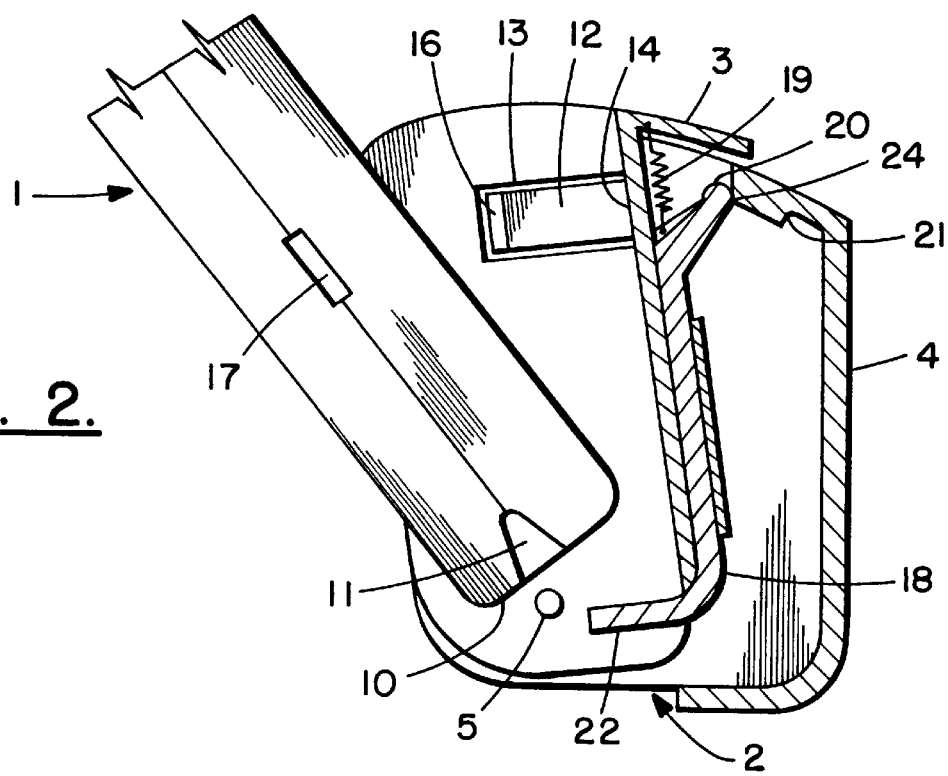
Figure 3:
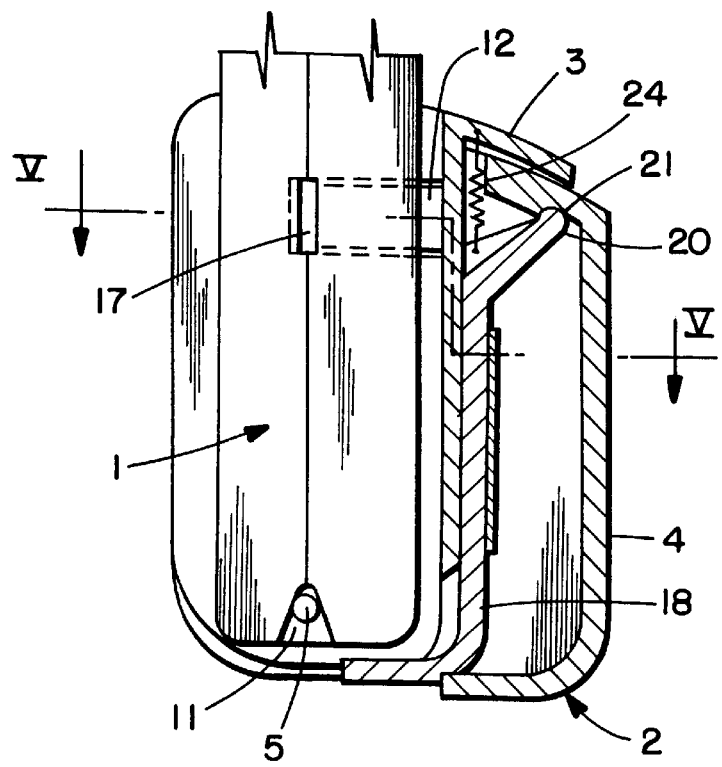
Figure 4:
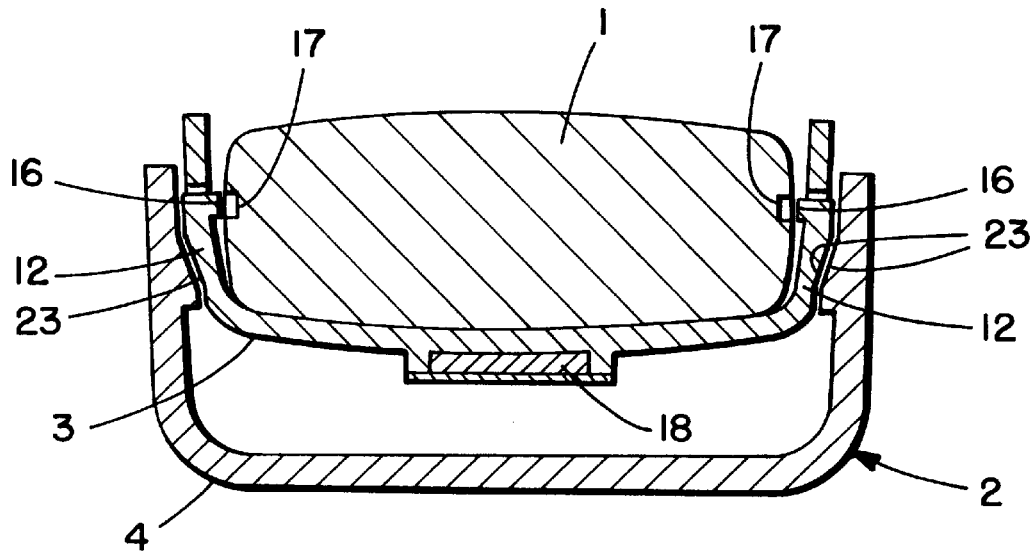
Figure 5:
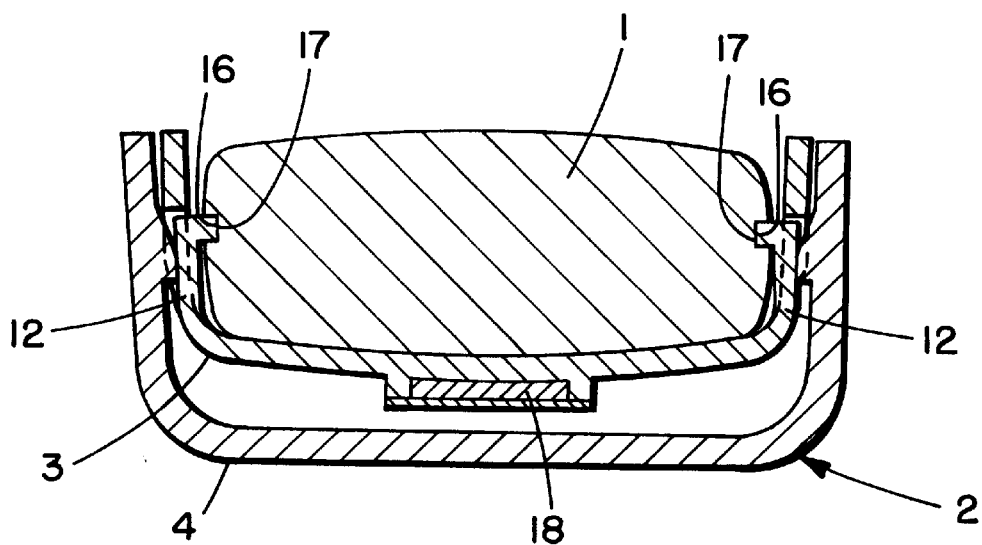

An embodiment of the invention is described below, by way of example, with reference to the accompanying drawings, in which:

FIG. 1 presents a telephone handset and a telephone holder in accordance with the present invention;

FIG. 2 presents a cross-section of the holder of FIG. 1, in which a telephone handset is being placed;

FIG. 3 presents a cross-section of the holder of FIG. 1 with a telephone being locked in the holder;

FIG. 4 is a horizontal section of the holder of FIG. 1 with a telephone adapted thereon prior to rotating the parts of the holder into locking position; and FIG. 5 is a horizontal section of the holder FIG. 1 in i.e. section V—V of FIG. 3.

FIG. 1 shows a telephone 1, such as a handset of a mobile phone, and a holder 2 in accordance with the invention, in which a telephone can be mounted and locked. The holder 2 is composed of two, primarily nested parts 3,4, the cradle portion 3 disposed substantially inside the mounting portion 4 serves as a base on which the telephone 1 can be positioned. The parts 3,4 of the holder are joined with a joining pin 5 located in the cradle portion 3, enabling the rotation of the portions relative to each other.

The holder 2 is in the form of a frontally open cup comprising three side walls 6, 7 and 8 and a bottom 9, into which cup a telephone handset 1 can be inserted through the open side as shown in FIG. 2. In the embodiment disclosed, a runner 11 is provided in the lower part 10 of the telephone for receiving the joining pin 5 between the holder portions 3,4 so that the joining pin serves as a retainer of the lower part 10 of the telephone placed in the holder (FIG. 3).

On the opposite sides 6,8 of the cradle portion 3 of the holder resilient tongues 12 have been provided to serve as locking members locking the telephone 1 with the holder. Both tongues 12 have been provided by making a narrow, U-shaped slit 13 on the side 6, 8 of the cradle portion 3 of the holder, to encircle the strip on three sides leaving it fastened at the bottom part 14 to the holder. The tip of each tongue 12 has been formed into a projection 16 directed inwards from the inner surface 15 of the holder. The sides of the telephone 1 are respectively provided with recesses 17 into which the projections 16 are inserted when locking the telephone with the holder.

The mutual movement of the portions 3,4 of the holder 2 articulated with one another is regulated by a rod-like slide 18 serving as a detent, being affixed on the outer surface of the side 7 of the cradle portion 3 of the holder and provided with a spring 19. For the tip 20 of the slide 18 a recess 21 has been made in the back part 4 of the holder, into which the tip of the slide may be urged by the spring 19. The opposite end of the slide 18 relative to said tip 20 is bent into a tongue 22 directed forward, which the lower end 10 of the telephone is able to press when placing the telephone into the holder.

FIGS. 4 and 5 show the bevelled clamping surfaces 23 provided on the outer sides of the tongues 12 in the cradle portion 3 of the holder and opposite thereto, on the inner sides of the mounting portion 4 of the holder. When the portions 3, 4 of the holder rotate relative to each other, the clamping surfaces 23 urge the tongues 12 so that they are automatically bent towards the telephone set 1 placed in the holder and the tips 16 of the strips protrude into the recesses 17 on the sides of the telephone, as shown in FIG. 5.

The telephone holder 2 as shown in the drawings is used so that when a telephone handset 1 is placed, e.g. as shown in FIG. 2, on the base provided by the cradle portion 3 of the holder, being in the position as shown in FIG. 4, the telephone depresses the tongue 22 of the slide 18 against the force of the spring 19 so that the tip 20 of the slide is released from beyond a shoulder 24 in the back part 4 of the holder. By pushing more the telephone 1 the cradle portion 3 of the holder is then able to rotate relative to the back part 4 until the slide tip 20 in the locking position shown in FIGS. 3 and 5 becomes locked drawn by the spring 19 into the recess 21 in the back part of the holder. Simultaneously the clamping surfaces 23 have forced the tips 16 of the tongues 12 to protrude into the recesses 17 provided in the telephone for them so that the telephone becomes locked with the holder. Releasing the telephone 1 from the holder 2 takes place by pulling slightly, which releases the slide tip 20 from the recess 21 and the parts of the holder return to the position shown in FIG. 4, in which the telephone can freely be lifted from the holder.

The portions of the holder can be fabricated from plastic by injection moulding. Alternatively, the mounting portion and the locating slide can be manufactured by casting from a metal. If the front part of the holder is made from a plastic which is softer than standard construction plastics, it is possible to wedge the telephone into the holder merely by means of friction, whereby the projections in the tips of the strips clamping against the telephone handset may be omitted. In such case, the locking members consist of the inner surfaces of the strips clamping against the telephone or of the inner surfaces of the entire front part of the holder which can be pressed against the telephone set. However, a firmer locking is secured with such projections.

In view of the foregoing description it will be clear to a person skilled in the art that modifications may be made without departing from the scope of the present invention.

We claim:

1. A holder for telephone comprising a cradle portion formed to receive a telephone, a mounting portion, the cradle portion being movably mounted on the mounting portion, and retaining means movable from a non-retaining position, wherein the retaining means do not exert a retaining force on a telephone placed in the cradle portion, to a retaining position, wherein the retaining means exerts a retaining force on a telephone placed in the cradle portion, wherein movement of the cradle portion between a first position and a second position urges the retaining means between said non-retaining position and said retaining position, the retaining means comprise tongues formed in side walls in said cradle portion, said tongues each having an inside face which contacts a telephone, when the cradle is in said second position and an outside face which contacts the mounting portion in the second position, and the outside face of said tongues and mounting portion adjacent said tongues are formed so as to urge the tongues between the non-retaining position and the retaining position during movement of the cradle portion with respect to the mount portion.

2. A holder as claimed in claim 1, wherein the cradle portion is mounted on the mounting means so as to enable rotational movement of the cradle portion with respect to the mounting portion.

3. A holder as claimed in claim 1, wherein the cradle portion comprises a locating slide movable with respect to the cradle portion, the locating slide having a tip at one end which is urged into a first location on the mounting portion when the cradle is in said first position and is urged into a second location on the mounting portion when the cradle is in said second position, so as to locate the cradle in either said first or second positions.

4. A holder as claimed in claim 3, wherein the locating slide is coupled to the cradle portion by a spring means which urges the tip of the locating slide into said first or said second locations.

5. A holder as claimed in claim 3, wherein an opposite end of the locating slide from said tip extends into the cradle portion so as to enable contact between a telephone placed in the cradle portion and said opposite end of the locating slide.

6. A holder as claimed in claim 5, wherein the exertion of a force on said opposite end of the locating slide urges the locating slide to move against the force of said spring means so as to enable movement of the tip between said locations in the mounting portion.

7. A holder as claimed in claim 1, wherein the inside face of said tongues each comprise a projection, formed so as to engage a recess in the side of a telephone.

8. A holder as claimed in claim 1, wherein the cradle portion comprises a location pin formed so as to locate a telephone in the cradle portion.

9. A holder for a telephone comprising:

a mount;

a cradle movably connected to the mount between a first position and a second position, the cradle including movable locking members; and means for automatically moving the locking members from a non-retaining position when the cradle is in the first position to a retaining position when the cradle is in the second position, the retaining position having the locking members contacting a telephone in the cradle to retain the telephone with the cradle, wherein the cradle includes a movable locating slide that functions as a detent with the mount to retain the cradle at the first and second positions until positively moved by a user, and wherein the slide includes an end located in a telephone receiving area of the cradle for being contacted by a telephone inserted into the cradle and being moved by the telephone.

10. A holder as in claim 9 wherein the cradle is pivotally connected to the mount.

11. A holder as in claim 9 wherein the locking members are comprised of cantilevers deflectable tongues on opposite sides of the cradle.

12. A holder for a telephone comprising:

a mount;

a cradle movably connected to the mount between a first position and a second position, the cradle including movable locking members; and means for automatically moving the locking members from a non-retaining position when the cradle is in the first position to a retaining position when the cradle is in the second position, the retaining position having the locking members contacting a telephone in the cradle to retain the telephone with the cradle, wherein the means for automatically moving includes the mount having inwardly facing wedging surfaces for contacting and wedging the locking members towards each other as the cradle is moved towards the second position.

13. A holder as in claim 10 wherein the cradle is pivotably connected to the mount by two pins that project into a telephone receiving area of the cradle.

14. A holder for a telephone comprising:

a mount having a stationary inwardly facing wedging surface; and a cradle movably connected to the mount between a first position for inserting a telephone into the cradle and removing an inserted telephone from the cradle and a second position for locking a telephone in the cradle, the cradle having a cantilevered deflectable tongue suitably positioned to be automatically inwardly deflected by the wedging surface when the cradle is moved from the first position to the second position.

* * * * *

UNITED STATES PATENT AND TRADEMARK OFFICE
CERTIFICATE OF CORRECTION

PATENT NO. : 5,898,775
DATED : 4/27/99
INVENTOR(S) : Mika Niemio, Jari Olkkola, Ari Leman It is certified that error appears in the above-identified patent and that said Letters Patent is hereby corrected as shown below:

On the title page, item [75], inventor "Niemo" should read --Niemio--.

Signed and Sealed this

Ninth Day of November, 1999

Attest:

Attesting Officer

Q. TODD DICKINSON

Acting Commissioner of Patents and Trademarks